(12) United States Patent
Mallya et al.

(10) Patent No.: US 7,310,430 B1
(45) Date of Patent: Dec. 18, 2007

(54) HYBRID CABLES FOR COMMUNICATION NETWORKS

(75) Inventors: Arvind R. Mallya, Walnut Creek, CA (US); Jack K. Swalley, Brentwood, CA (US)

(73) Assignee: SBC Knowledge Ventures, Reno, NV (US)

( * ) Notice: Subject to any disclaimer, the term of this patent is extended or adjusted under 35 U.S.C. 154(b) by 0 days.

(21) Appl. No.: 11/446,544

(22) Filed: Jun. 2, 2006

(51) Int. Cl.
*G02B 6/44* (2006.01)
(52) U.S. Cl. .................................... 382/101
(58) Field of Classification Search ............... 385/101, 385/114, 104, 111, 112, 113; 439/577
See application file for complete search history.

(56) References Cited

U.S. PATENT DOCUMENTS

| | | | |
|---|---|---|---|
| 4,852,965 A | | 8/1989 | Mullin et al. |
| 5,140,319 A | | 8/1992 | Riordan |
| 5,224,190 A | | 6/1993 | Chu et al. |
| 5,268,971 A | * | 12/1993 | Nilsson et al. ............. 385/101 |
| 5,418,878 A | * | 5/1995 | Sass et al. ............. 385/101 |
| 5,469,523 A | | 11/1995 | Blew et al. |
| 5,495,547 A | | 2/1996 | Rafie et al. |
| 5,557,698 A | | 9/1996 | Gareis et al. |
| 5,623,531 A | | 4/1997 | Nilssen |
| 5,745,627 A | | 4/1998 | Arroyo et al. |
| 5,896,482 A | | 4/1999 | Blee et al. |
| 5,913,003 A | * | 6/1999 | Arroyo et al. ............. 385/101 |
| 5,917,977 A | * | 6/1999 | Barrett ............. 385/101 |
| 6,028,975 A | | 2/2000 | Davidson |
| 6,169,834 B1 | | 1/2001 | Keller et al. |
| RE37,125 E | | 4/2001 | Carlson et al. |
| 6,317,541 B1 | | 11/2001 | Davidson |
| 6,349,161 B1 | * | 2/2002 | Gleason et al. ............. 385/113 |

* cited by examiner

*Primary Examiner*—Chandrika Prasad
(74) *Attorney, Agent, or Firm*—Hanley, Flight & Zimmerman, LLC

(57) ABSTRACT

Hybrid cables for communication networks are disclosed. An example cable includes a plurality of electrical conductors disposed along a central axis of the cable. The plurality of electrical conductors includes a first twisted pair cable in a twisted configuration with a second twisted pair cable. The cable also includes a first jacket surrounding the plurality of electrical conductors and a plurality of optical fibers adjacent to an outer surface of the first jacket.

25 Claims, 4 Drawing Sheets

HYBRID CABLES FOR COMMUNICATION NETWORKS

FIELD OF THE DISCLOSURE

The present disclosure relates generally to communications systems and, more particularly, to hybrid cables for communication networks.

BACKGROUND

Telecommunication companies often upgrade existing communication networks implemented using copper cables by replacing the previously installed copper cables with optical fiber to provide relatively higher bandwidth to customers. In addition, in newly developed areas (e.g., new residential areas or new business areas) telecommunication companies have expanded existing networks using optical fiber. Unlike traditional electrically conductive cables (e.g., copper cables), optical fiber provides relatively higher bandwidth that enables many more types of data/voice communication services and the ability to serve more customers using fewer communication media. For example, one optical fiber can carry data/voice information corresponding to the same number of customers that would ordinarily require a plurality of electrical conductors.

A drawback to replacing electrical conductors with optical fiber or installing only optical fibers in new areas is lack of a medium to carry electrical power. That is, in network portions that use electrical conductors, the electrical conductors can carry electrical power to power telecommunications equipment (e.g., switches) located in remote areas. However, without the electrical conductors, power must be supplied from alternate sources such as, for example, power company power grids, batteries, etc. However, tapping into power company power grids to obtain electrical power is an added expense. Additionally, if the power grid fails, which often happens during inclement weather, customers may be left without voice and/or data communication services. Such outages are not acceptable according to Federal Communication Commission regulations that prohibit landline voice communications from failing for more than a specified amount of time per year, which is far less than the duration for which power grids fail per year.

DETAILED DESCRIPTION

Figure 1:
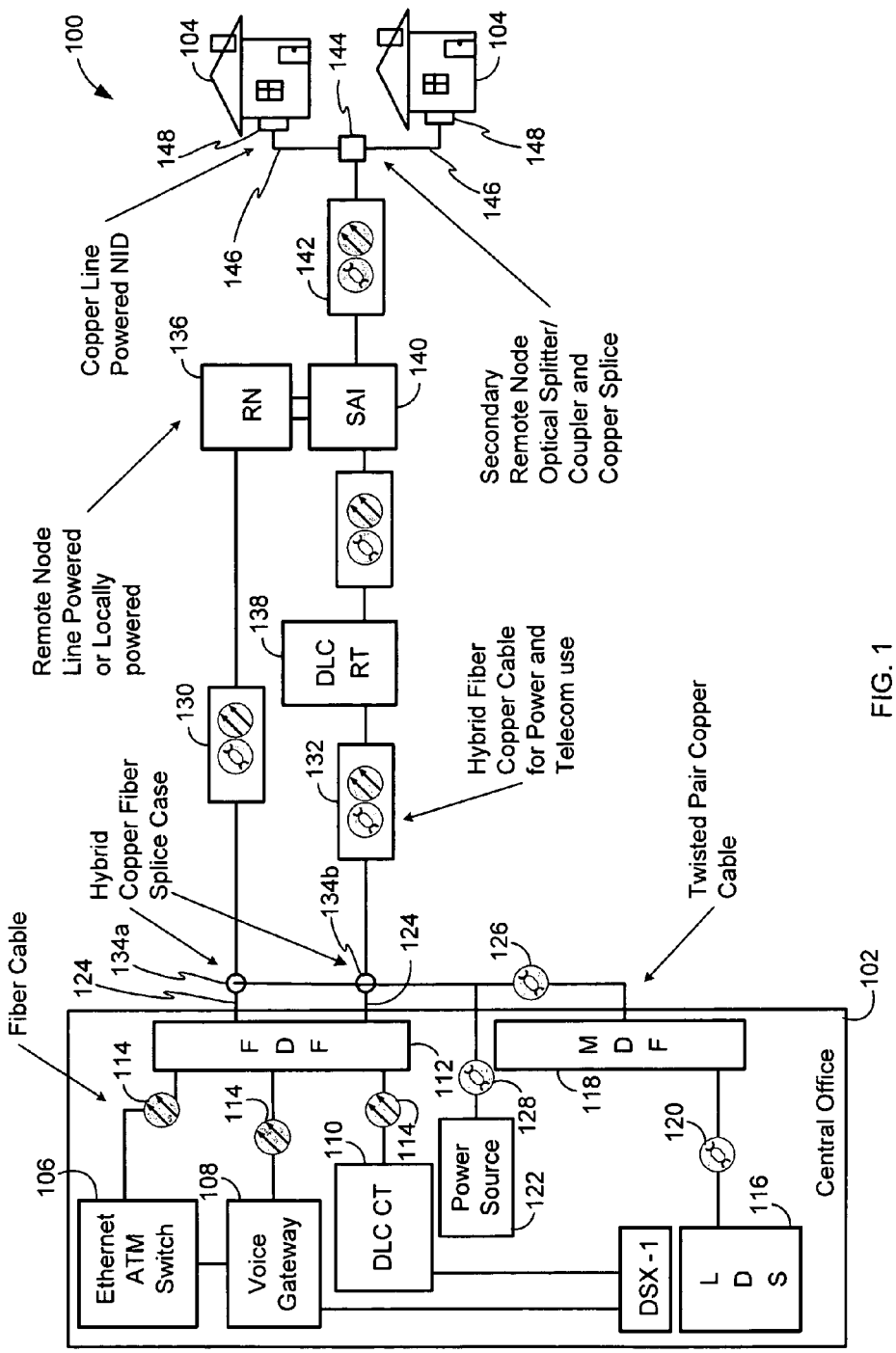
FIG. 1 depicts an example network system that may be implemented using the example hybrid cables described herein.

The example hybrid cables for communication networks described herein may be used to carry optical communication signals, electrical communication signals, and/or electrical power to power remotely located telecommunications equipment. The telecommunications equipment may include switches, remote terminals, etc. used to implement a service provider's network and/or telecommunications equipment (e.g., telephones, network interface devices, modems, etc.) located at customer premises (e.g., customer houses, office buildings, etc.).

An example hybrid cable includes a plurality of electrical conductors (e.g., a bundle of electrical conductors) disposed along a central axis of the hybrid cable. In an example implementation, the plurality of electrical conductors may include a first twisted pair cable in a twisted configuration with a second twisted pair cable. In some example implementations, the first twisted pair cable may be configured to carry a communication signal and the second twisted pair cable may be configured to carry electricity without a communication signal. In another example implementation, the plurality of electrical conductors may include coaxial cables. The example hybrid cable also includes a first jacket (e.g., a polyethylene jacket) surrounding the plurality of electrical conductors and a plurality of optical fibers adjacent to (e.g., about, next to, indirectly/directly on, etc.) an outer surface of the first jacket. Also, the example hybrid cable may include a water-blocking jacket surrounding the plurality of optical fibers to keep moisture out of the cable. In addition, the plurality of optical fibers may be circumferentially spaced, in a radial configuration, braided, and/or twisted around the first jacket.

Cables are often implemented using strain relief members and/or compression relief members separate from electrical conductors or optical fibers to maintain structural integrity against external forces (e.g., wind, compacting dirt, under water currents, etc.) that act upon the cables. Unlike known cables that require a separate strain relief member and/or compression member often implemented using a strengthened nylon member, in the example hybrid cables described herein, the bundle of electrical conductors may finction as the strain relief member and/or the compression relief member.

Carrying power on electrical conductors can increase the heat of the electrical conductors. Varying temperature of an electrical conductor can change its electrical conductivity properties or characteristics and its communication properties or characteristics. To substantially reduce, minimize, or eliminate the heat transfer from electrical conductors used to carry electrical power to electrical conductors used to communicate information, power-carrying conductors (e.g., a first twisted pair cable) and signal-carrying conductors (e.g., a second twisted pair cable) are arranged relative to one another to substantially reduce heat transfer from the power-carrying conductor to the signal-carrying conductor.

An example method for using an example hybrid cable described herein involves transmitting an electrical communication signal via first conductors (e.g., twisted-pair conductors or coaxial cable conductors) in a plurality of conductors disposed along a central axis of the hybrid cable. Electrical power without a communication signal is then transmitted via second conductors (e.g., second twisted-pair conductors or coaxial cable conductors) in the plurality of conductors. Also, an optical communication signal is transmitted via one of a plurality of optical fibers arranged adjacent to (e.g., about, next to, indirectly/directly on, etc.) the plurality of conductors (e.g., the plurality of optical fibers may be arranged in a radial configuration, circumferentially spaced, braided, and/or twisted around the plurality of conductors.

An example method for installing, repairing, and/or performing maintenance on an example hybrid cable involves coupling first conductors to an electrical signal communicator and coupling second conductors to an electricity supply or power source. In an example implementation, first and second twisted pair conductors form part of a bundle of conductors located along an axial center of the example hybrid cable. One of a plurality of optical fibers can then be coupled to an optical signal communicator. The plurality of optical fibers are adjacent to (e.g., about, next to, indirectly/directly on, etc.) the bundle of conductors (e.g., the plurality of optical fibers are arranged in a radial configuration, circumferentially spaced, twisted, and/or braided around or about the bundle of conductors). In some example implementations, the method may involve removing a water-blocking jacket surrounding the plurality of optical fibers and/or removing a polyethylene jacket surrounding the first and second twisted pair conductors. In an example implementation, a tool may be configured to facilitate carrying out the example method for installing, repairing, and/or performing maintenance on the example hybrid cable.

Another example hybrid cable includes a plurality of optical fibers (e.g., a bundle of optical fibers, an optical ribbon fiber bundle, etc.) disposed along a central axis of the cable and a jacket (e.g., a water-blocking jacket) surrounding the plurality of optical fibers. The example hybrid cable also includes a plurality of bundles of electrical conductors (i.e., a plurality of electrical conductor bundles) circumferentially spaced around an outer surface of the jacket. At least some of the electrical conductors bundles are configured to carry at least one of information or electrical power.

In some example implementations, the example hybrid cable includes a dry-core tube surrounding the plurality of optical fibers. In addition, one or more of the electrical conductor bundles may form at least one of a strain relief member or a compression relief member. In some example implementations, one or more of the electrical conductor bundles may include twisted pair conductors and/or coaxial cable conductors. Also, the electrical conductors may be in a twisted configuration with one another (e.g., two or more twisted pair conductors and/or two or more coaxial cable conductors may be in a twisted configuration with one another).

Another example method for using an example hybrid cable involves transmitting an optical communication signal via one of a plurality of optical fibers (e.g., a bundle of optical fibers, an optical ribbon fiber bundle) disposed along a central axial portion of the cable. The example method also involves transmitting an electrical communication signal via at least a first electrical conductor disposed in one of a plurality of electrical conductor bundles circumferentially spaced around the plurality of optical fibers. In addition, electrical power without a communication signal is transmitted via at least a second electrical conductor disposed in any of the electrical conductor bundles.

Another example method for installing, repairing, and/or performing maintenance on an example hybrid cable involves coupling one of a plurality of optical fibers disposed along a central axial portion of the cable to an optical signal communicator. The example method also involves coupling a first electrical conductor to an electrical signal communicator and a second electrical conductor to an electricity supply. The first and second electrical conductors are disposed in one of a plurality of electrical conductor bundles circumferentially spaced around (e.g., in a radial configuration around) the plurality of optical fibers. In some example implementations, the method involves removing a water-blocking jacket and/or a dry-core tube surrounding the plurality of optical fibers. In an example implementation, a tool may be configured to facilitate carrying out the example method for installing, repairing, and/or performing maintenance on the example hybrid cable.

Turning to FIG. 1, an example network system 100 includes a central office 102 that exchanges voice and data information with customer sites 104 (i.e., subscriber sites 104). The central office 102 enables the customer sites 104 to transmit and/or receive voice and data information with each other and/or other entities. For example, the central office 102 may enable landline analog and/or digital telephone services, Internet services, data networking services, video services, television services, radio services, etc. Example hybrid twisted-pair fiber cables described herein may be used to communicatively couple components within the central office 102 with communications equipment at the customer sites 104 (i.e., customer premises equipment ("CPE")). In this manner, information may be exchanged between the central office 102 and the customer sites 104 using electrical signals and/or optical signals. Electrical signal communications may include, for example, plain old telephone service ("POTS") communications, analog digital subscriber line ("ADSL") communications, etc. Optical signal communications may include, for example, wave division multiplexing ("WDM") communications, dense WDM ("DWDM") communications, synchronous optical network ("SONET") communications, etc. In the illustrated example, the electrical conductors of the example hybrid twisted-pair fiber cables are implemented using copper. However, in other example implementations any other conductive material may be used instead.

In the illustrated example of FIG. 1, the central office 102 includes an Ethernet asynchronous transfer mode ("ATM") switch 106, a voice gateway 108, and a digital loop carrier at a central office terminal ("DLC CT") 110. The Ethernet ATM switch 106, the voice gateway 108, and the DLC CT 110 are communicatively coupled to a fiber distribution frame ("FDF") 112 via optical fibers 114.

The central office 102 is also provided with a local digital switch ("LDS") 116. The LDS 116 is communicatively coupled with main distribution frame ("MDF") 118 via a copper cable 120. In addition, to provide electrical power to remotely located communications equipment and/or to communications equipment (e.g., network access devices, telephones, modems, etc.) located at the customer sites 104, the central office 102 is provided with a power source 122.

Optical fibers 124 communicatively coupled to the FDF 112 and twisted pair copper cables 126 and 128 communicatively and/or electrically coupled to the MDF 118 are spliced with example hybrid twisted-pair fiber cables 130 and 132 at copper-fiber splice cases 134a and 134b. The hybrid twisted-pair fiber cables 130 and 132 are used to deliver electrical power and carry voice and data information. The hybrid twisted-pair fiber cables 130 and 132 may also be used to communicatively couple one or more remote nodes 136 (e.g., remote node digital subscriber line access multiplexers ("RN DSLAM's")), DLC remote terminals ("RT's") 138, serving area interfaces ("SAI's") 140, and/or any other equipment to the central office 102. In addition, an example hybrid twisted-pair fiber cable 142 is used to communicatively and/or electrically couple the SAI 140 to a secondary remote node 144 (e.g., an optical splitter/coupler and copper splicer). Copper cables 146 are then used to communicatively and/or electrically couple the secondary remote node 144 to network interface devices ("NID's") 148 at the customer sites 104. Additionally or alternatively, the secondary remote node 144 may be communicatively coupled to the NID's 148 using example hybrid cables substantially similar or identical to the example hybrid twisted-pair fiber cables 130, 132, and 142. In this manner, relatively higher bandwidth capabilities may be provided to the customer sites 104 while simultaneously providing electrical power from the power source 122 at the central office 102 to the NID's 148. Providing electrical power from the power source 122 enables the NID's 148 to continue providing communication services at the customer sites 104 when power grid failures occur at the customer sites 104.

Figure 2:
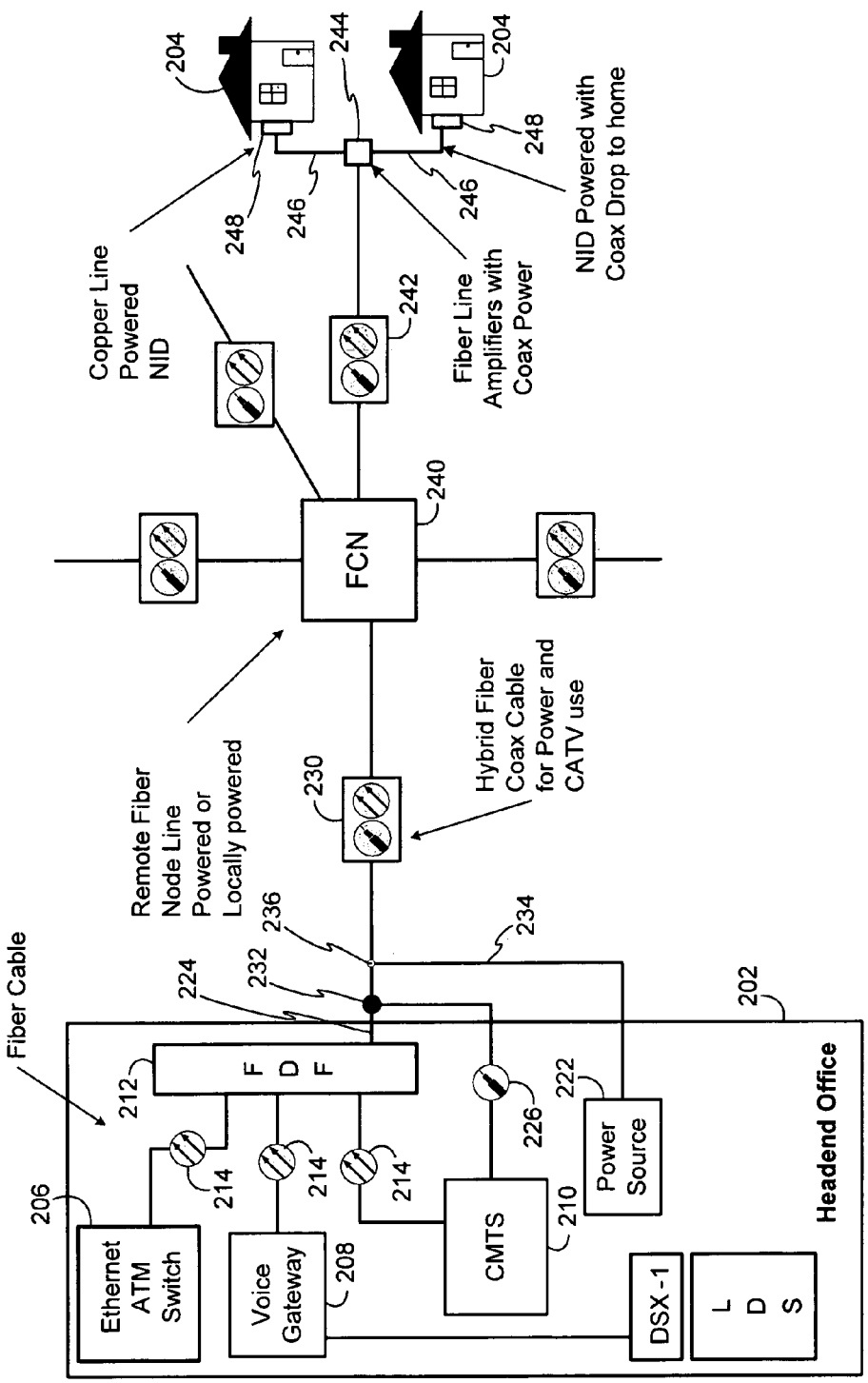
FIG. 2 depicts another example network system that may be implemented using the example hybrid cables described herein.

FIG. 2 depicts another example network system 200 that may be implemented using the example hybrid cables described herein. In the illustrated example, the example network system 200 is implemented using example hybrid fiber coaxial cables to carry optical communication signals and electrical communication signals between a headend office 202 and customer sites 204. In the illustrated example of FIG. 2, the headend office 202 includes an Ethernet ATM switch 206, a voice gateway 208, and a cable modem termination system ("CMTS") 210. The Ethernet ATM switch 206, the voice gateway 208, and the CMTS 210 are communicatively coupled to a FDF 212 via optical fibers 214. To provide electrical power to remotely located communications equipment and/or to communications equipment (e.g., network access devices, telephones, modems, etc.) located at the customer sites 204, the headend office 202 is provided with a power source 222.

An optical fiber 224 communicatively coupled to the FDF 212 at the headend office 202 and a coaxial cable 226 communicatively and/or electrically coupled to the CMTS 210 at the headend office 202 are spliced with an example hybrid coaxial fiber cable 230 at a coaxial-fiber splice case 232. In addition, a copper cable 234 electrically coupled to the power source 222 and the hybrid coaxial fiber cable 230 are spliced at a copper-fiber splice case 236. In the illustrated example, the hybrid coaxial fiber cable 230 is used to deliver electrical power, data/video/audio communication information, etc. The hybrid coaxial fiber cable 230 may also be used to communicatively couple a fiber coax node ("FCN") 240 and/or any other communications equipment to the headend office 202. In addition, an example coaxial hybrid cable 242 is used to communicatively and/or electrically couple the VCN 240 to a fiber line amplifier 244 powered via the coaxial cable portion of the hybrid coaxial fiber cable 242. Coaxial cables 246 are then used to communicatively and/or electrically couple the fiber line amplifier 244 to NID's 248 at the customer sites 204. Additionally or alternatively, the fiber line amplifier 244 may be communicatively coupled to the NID's 248 using example hybrid cables substantially similar or identical to the example hybrid coaxial fiber cables 230 and 242.

Figure 3:
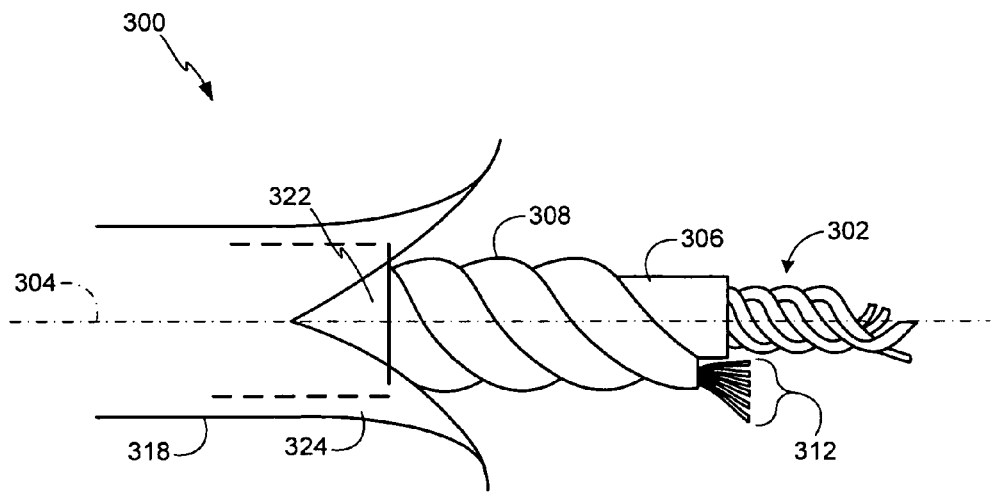
FIG. 3 depicts a side view of an example hybrid cable.
Figure 4:
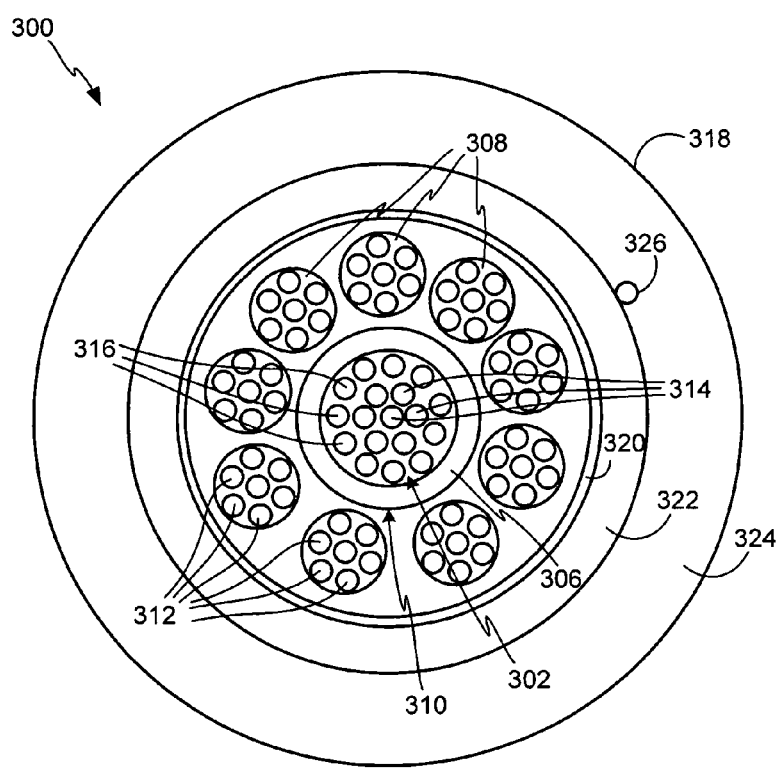
FIG. 4 depicts a cross-sectional view of the example hybrid cable of FIG. 3.

FIG. 3 depicts a side view of an example hybrid cable 300 and FIG. 4 depicts a cross-sectional view of the example hybrid cable 300. The example hybrid cable 300 may be used to implement the example hybrid twisted-pair fiber cables 130, 132, and 142 described above in connection with FIG. 1. As shown in FIGS. 3 and 4, the example hybrid cable 300 includes a plurality of electrical conductors 302 (e.g., a bundle of electrical conductors 302) disposed along a central axis 304 of the hybrid cable 300. In the illustrated example, the plurality of electrical conductors 302 are implemented using individually insulated twisted pair cables (e.g., two or more twisted pair cables) in a twisted or braided configuration and may be used to communicate data (e.g., voice, data, video, audio information) and/or carry electrical power (e.g., carry electricity without a communication/data signal). The twisted-pair cables may be implemented using 19-26 AWG (i.e., American Wire Gauge) copper pairs. The example hybrid cable 300 also includes a polyethylene jacket 306 (or a jacket made of any other suitable material) surrounding the plurality of electrical conductors 302 and a plurality of optical fiber bundles 308 adjacent to (e.g., about, next to, indirectly/directly on, etc.) an outer surface 310 of the polyethylene jacket 306. The optical fiber bundles 308 include a plurality of optical fibers 312 that may be used to communicate information (e.g., voice, data, video, audio, etc.).

Unlike known cables, the hybrid cable 300 does not include a separate strain relief member and/or a separate compression relief member. Instead, the plurality of electrical conductors 302 functions as a strain relief member and/or a compression relief member. By providing the plurality of electrical conductors 302 in a twisted or braided configuration, the plurality of electrical conductors 302 are provided with relatively more strength and/or resilience than one of the electrical conductors 302 would provide alone. In this manner, the plurality of electrical conductors 302 are suitably configured to provide strain relief and/or compression relief for the hybrid cable 300.

Temperature variations in materials such as electrically conductive materials can change the conductivity and, thus, communication properties of those materials. Electrical conductors carrying electrical power (i.e., power-carrying conductors) typically generate more heat than electrical conductors carrying relatively lower voltage communication signals (i.e., signal-carrying conductors). To maintain the properties or characteristics of signal-carrying conductors substantially stable or the same throughout operation, the plurality of electrical conductors 302 are arranged to substantially reduce, minimize, or eliminate heat transfer from electrical power-carrying conductors to electrical signal-carrying conductors. As is known from laws of thermal transfer, heat from one body is typically transferred to relatively cooler neighboring bodies. In a cable, heat typically radiates or transfers away from a central axis of the cable toward the outside of the cable because the external surface of the cable is relatively cooler than the internal portions of the cable.

In the illustrated example of FIG. 3, the plurality of electrical conductors 302 is provided with electrical conductors 314 to carry communication signals (i.e., signal-carrying conductors 314) and electrical conductors 316 to carry electrical power (i.e., power-carrying conductors 316). To reduce the amount of heat transferred from the power-carrying conductors 316 to the signal-carrying conductors 314, the signal-carrying conductors 314 may be arranged substantially closer to the central axis 304 than the power-carrying conductors 316. In this manner, heat generated by the power-carrying conductors 316 substantially radiates away from the signal-carrying conductors 314 and toward an outer surface 318 of the example hybrid cable 300. The signal-carrying conductors 314 may be twisted together or braided together separate from the power-carrying conductors 316. The power-carrying conductors 316 may be twisted, braided, or otherwise arranged around a bundle or a plurality of the signal-carrying conductors 314. In an alternative example implementation, the signal-carrying conductors 314 and the power-carrying conductors 316 may be braided or twisted together and the signal-carrying conductors 314 may be arranged substantially closer to the central axis 304 than the power-carrying conductors 316.

As shown in FIG. 3, the optical fiber bundles 308 may be arranged on outer surface 310 of the polyethylene jacket 306. For example, optical fibers 308 may be circumferentially spaced, placed in a radial configuration, braided, and/or twisted around the polyethylene jacket 306. To protect the optical fiber bundles 308 and the plurality of electrical conductors 302 from moisture and water, the example hybrid cable 300 is provided with a water-blocking jacket 320 (e.g., a water-blocking tape). 100311 To protect the optical fiber bundles 308 and the plurality of electrical conductors 302 from outside forces that may be, for example, applied to the outer surface 318 of the hybrid cable 300, the example hybrid cable 300 is provided with a strength jacket 322 that surrounds the water-blocking jacket 320 and which may be implemented using a Kevlar-strength yarn. The strength jacket 322 is then surrounded with an external polyethylene jacket 324 (or an external jacket made of any other suitable material). The example hybrid cable 300 is also provided with a rip cord 326 between the strength jacket 322 and the external polyethylene jacket 324 to facilitate removal of the external polyethylene jacket 324 during installation or repair of the example hybrid cable 300.

Figure 5:
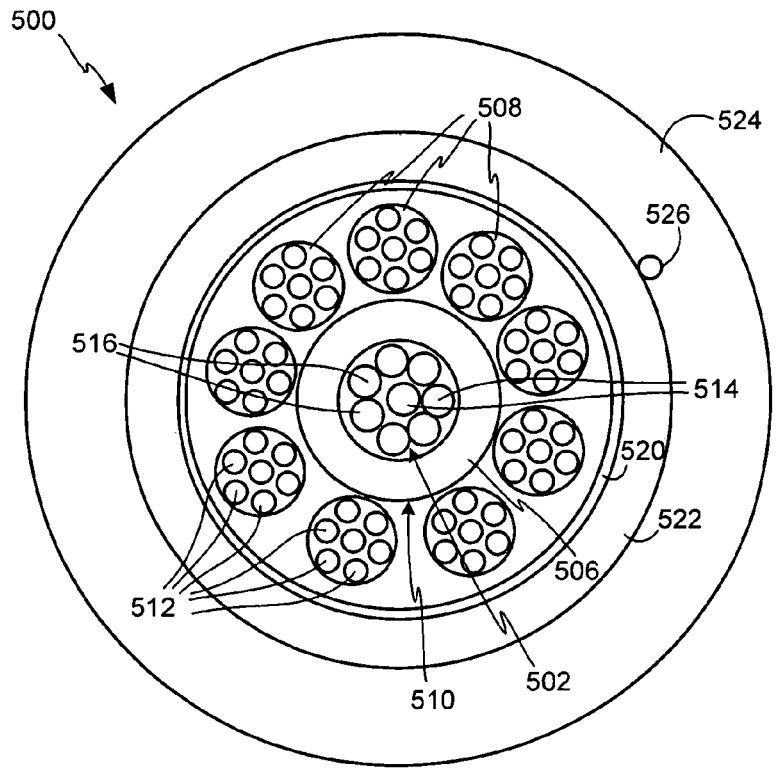
FIG. 5 depicts a cross-sectional view of another example hybrid cable.

FIG. 5 depicts a cross-sectional view of another example hybrid cable 500. The example hybrid cable 500 may be used to implement the example hybrid coaxial fiber cables 230 and 242 described above in connection with FIG. 2. The example hybrid cable 500 includes a plurality of electrical conductors 502 (e.g., a bundle of electrical conductors 502) disposed along a central axis (not shown) (e.g., the central axis 304 shown in FIG. 3) of the example hybrid cable 500. The plurality of electrical conductors 502 may be implemented using individually insulated RG-6 (i.e., Radio Guide type-6 coaxial conductor) shielded double over-jacketed cable. However, other types of coaxial cable may be used instead. The example hybrid cable 300 also includes a polyethylene jacket 506 (or a jacket made of any other suitable material) surrounding the plurality of electrical conductors 502 and a plurality of optical fiber bundles 508 on an outer surface 510 of the polyethylene jacket 506. The polyethylene jacket 506 may be substantially thicker and stronger than the polyethylene jacket 306 of the example hybrid cable 300. The optical fiber bundles 508 include a plurality of optical fibers 512. The electrical conductors 502 and the optical fibers 512 may be used to communicate information (e.g., voice, data, video, audio, etc.). In addition, one or more of the electrical conductors 502 may be used to carry electrical power (e.g., carry electricity without a communication/data signal).

The plurality of electrical conductors 502 may include signal-carrying conductors 514 and electrical power carrying conductors 516. To reduce the amount of heat transferred from the power-carrying conductors 516 to the signal-carrying conductors 514, the signal-carrying conductors 514 may be arranged substantially closer to the central axis of the example hybrid cable 500 than the power-carrying conductors 516 so that heat generated by the power-carrying conductors 516 radiates substantially away from the signal-carrying conductors 514 and toward an outer surface 518 of the example hybrid cable 500.

The example hybrid cable 500 is also provided with a water-blocking jacket 520 (e.g., a water-blocking tape), a strength jacket 522, an external polyethylene jacket 524 (or an external jacket made of any other suitable material), and a rip cord 526. The water-blocking jacket 520, the strength jacket 522, the external polyethylene jacket 524, and the rip cord 526 are substantially similar or identical to the water-blocking jacket 320, the strength jacket 322, the external polyethylene jacket 324, and the rip cord 326 described, respectively, above in connection with FIG. 3.

A network element (e.g., a coupling device, a receptacle, the DLC RT 138 of FIG. I, the SAI 140 of FIG. 1, or any other communication device) may be configured to be coupled to the example hybrid cable 300 and/or the example hybrid cable 500. For example, the network element may include a first interface to connect to at least one of a plurality of electrical conductors (e.g., the plurality of electrical conductors 314 and 316 of FIG. 4 or 514 and 516 of FIG. 5) disposed along a central axis (e.g., the central axis 304 of FIG. 3) of a cable (e.g., one of the cables 300 or 500). The network element may also include a second interface to connect to one of a plurality of optical fibers (e.g., the optical fibers 312 of FIGS. 3 and 4 or the optical fibers 512 of FIG. 5) adjacent to (e.g., in a radial configuration around, circumferentially spaced around, etc.) the plurality of electrical conductors. In some example implementations, the network element may be configured to be powered via one of the plurality of electrical conductors. In addition, the network element may be configured to receive a communication signal via the at least one of the plurality of electrical conductors or via at least one of the plurality of optical fibers.

Figure 6:
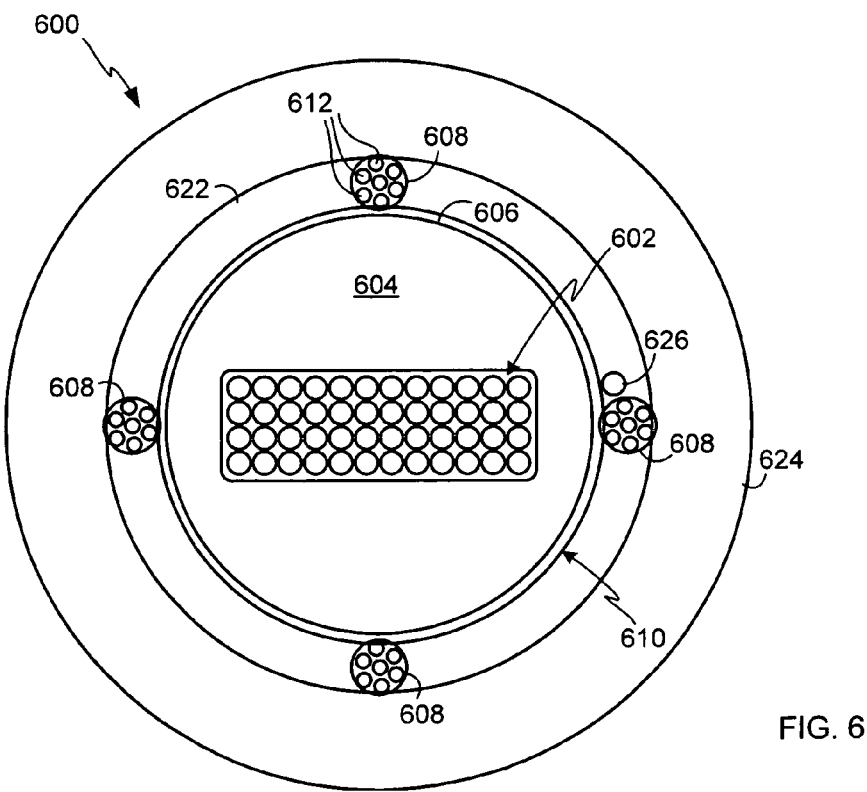
FIG. 6 depicts a cross-sectional view of yet another example hybrid cable.

FIG. 6 depicts a cross-sectional view of another example hybrid cable 600. The example hybrid cable 600 may be used to implement the example network systems 100 and/or 200 of FIGS. 1 and 2. In the illustrated example, the example hybrid cable 600 includes a plurality of optical fibers 602 (e.g., an optical ribbon fiber bundle) disposed along a central axis (not shown) (e.g., the central axis 304 shown in FIG. 3) of the example hybrid cable 600. The example hybrid cable 600 also includes a dry-core central tube 604 that insulates and protects the optical fibers 602 and keeps the optical fibers 602 substantially free from water and moisture. In the illustrated example, the dry-core central tube 604 is surrounded by a water-blocking jacket 606.

The example hybrid cable 600 is also provided with a plurality of electrical conductor bundles 608 on an outer surface 610 of the water-blocking jacket 606. In the illustrated example, the electrical conductor bundles 608 are circumferentially spaced or in a radial configuration around the water-blocking jacket 606. However, the electrical conductor bundles 608 may additionally or alternatively be twisted or braided around the water-blocking jacket 606. The electrical conductor bundles 608 include a plurality of electrical conductors 612 that may be implemented using individually insulated 19-26 AWG twisted pair copper conductors and/or RG-6 coaxial cable conductors. Of course, in alternative example implementations, the plurality of electrical conductors 612 may be implemented using other types of electrical conductors.

The optical fibers 602 and the electrical conductors 612 may be used to communicate information (e.g., voice, data, video, audio, etc.). In addition, one or more of the electrical conductors 612 may be used to carry electrical power (e.g., carry electricity without a communication/data signal). To reduce the amount of heat transferred from the power-carrying conductors to signal-carrying conductors, the electrical conductors may be arranged as described above in connection with FIGS. 3 and 5 so that heat from power-carrying conductors dissipates substantially away from signal-carrying conductors.

In the illustrated example, the electrical conductor bundles 608 are also used to provide strain relief and/or compression relief for the example hybrid cable 600. That is, in addition to carrying communication signals and/or electrical power, the electrical conductor bundles 608 may also function as strain relief members and/or compression relief members for the example hybrid cable 600. For example, twisting or braiding the electrical conductors 612 provides the electrical conductor bundles 608 with relatively more strength and/or resilience than one electrical conductor 612 would have alone. In this manner, one or more of the electrical conductor bundles 608 are suitably configured to provide strain relief and/or compression relief for the example hybrid cable 600.

The example hybrid cable 600 is also provided with a strength jacket 622, an external polyethylene jacket 624 (or an external jacket made of any other suitable material), and a rip cord 626. The strength jacket 622, the external polyethylene jacket 624, and the rip cord 626 are substantially similar or identical to the strength jacket 622, the external polyethylene jacket 624, and the rip cord 626, respectively, described above in connection with FIG. 3.

A network element (e.g., a coupling device, a receptacle, the DLC RT 138 of FIG. 1, the SAI 140 of FIG. 1, or any other communication device) may be configured to be coupled to the example hybrid cable 600. For example, the network element may include a first interface to connect to at least one of the plurality of optical fibers 602 disposed along a central axis of the cable 600. The network element may also include a second interface to connect to at least one of the electrical conductors 612 within one of the electrical conductor bundles 608. In some example implementations, the network element may be configured to be powered via at least one of the electrical conductors 612. In addition, the network element may be configured to receive a communication signal via one of the electrical conductors and/or one of the optical fibers 602.

To the extent the above specification describes example components and functions with reference to particular devices, standards and/or protocols, it is understood that the teachings of the invention are not limited to such devices, standards and/or protocols. Such devices are periodically superseded by faster or more efficient systems having the same general purpose. Accordingly, replacement devices, standards and/or protocols having the same general functions are equivalents which are intended to be included within the scope of the accompanying claims.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A cable comprising:
    a plurality of electrical conductors disposed along a central axis of the cable, wherein the plurality of electrical conductors includes a first twisted pair cable in a twisted configuration with a second twisted pair cable;
    a first jacket surrounding the plurality of electrical conductors; and
    a plurality of optical fibers adjacent to an outer surface of the first jacket.

2. A cable as defined in claim 1, wherein the optical fibers are circumferentially spaced around the first jacket.

3. A cable as defined in claim 1, wherein the first twisted pair cable is configured to carry a communication signal, and wherein the second twisted pair cable is configured to carry electricity without a communication signal.

4. A cable as defined in claim 1, wherein the plurality of electrical conductors forms at least one of a strain relief member or a compression relief member.

5. A cable as defined in claim 1, wherein the first twisted pair cable and the second twisted pair cable are arranged to minimize heat transfer from the second twisted pair cable to the first twisted pair cable.

6. A cable as defined in claim 1, wherein the plurality of electrical conductors includes at least one of a copper conductor.

7. A cable as defined in claim 1, wherein the first jacket is a polyethylene jacket.

8. A cable as defined in claim 1, further comprising a water-blocking jacket surrounding the plurality of optical fibers.

9. An apparatus comprising:
    a bundle of electrical conductors along an axial center of a cable, wherein the bundle of electrical conductors includes a first twisted pair cable in a twisted configuration with a second twisted pair cable;
    a first jacket surrounding the bundle of electrical conductors; and
    a plurality of optical fibers adjacent to the first jacket.

10. An apparatus as defined in claim 9, wherein the first twisted pair cable is configured to carry a communication signal, and wherein the second twisted pair cable is configured to carry electricity without a communication signal.

11. An apparatus as defined in claim 9, wherein the plurality of optical fibers are arranged in a radial configuration around the first jacket.

12. An apparatus as defined in claim 9, wherein the bundle of electrical conductors forms at least one of a strain relief member or a compression relief member.

13. An apparatus as defined in claim 9, wherein the first twisted pair cable and the second twisted pair cable are arranged to minimize heat transfer from the second twisted pair cable to the first twisted pair cable.

14. An apparatus as defined in claim 9, wherein the bundle of electrical conductors includes at least one of a copper conductor.

15. An apparatus as defined in claim 9, wherein the first jacket is a polyethylene jacket.

16. An apparatus as defined in claim 9, further comprising a water-blocking jacket surrounding the plurality of optical fibers.

17. An apparatus as defined in claim 9, wherein the plurality of optical fibers are grouped into a plurality of optical fiber bundles, and wherein the plurality of optical fiber bundles are in a radial configuration around the bundle of electrical conductors.

18. A cable comprising:
    a plurality of optical fibers disposed along a central axis of the cable;
    a jacket surrounding the plurality of optical fibers; and
    a plurality of bundles of electrical conductors adjacent to an outer surface of the jacket, wherein the plurality of bundles of electrical conductors form at least one of a strain relief member or a compression relief member, and wherein at least some of the bundles of electrical conductors are configured to carry at least one of information or electrical power.

19. A cable as defined in claim 18, wherein the plurality of optical fibers comprises an optical fiber ribbon.

20. A cable as defined in claim 18, wherein the plurality of bundles of electrical conductors are circumferentially spaced around the outer surface of the jacket.

21. A cable as defined in claim 18, wherein the at least some of the electrical conductors are in a twisted configuration with one another.

22. A cable as defined in claim 18, wherein at least some of the bundles of electrical conductors include at least one of a twisted pair conductor or a coaxial cable conductor.

23. A cable as defined in claim 18, wherein the jacket is a water-blocking jacket.

24. A cable as defined in claim 18, further comprising a dry-core tube surrounding the plurality of optical fibers, wherein the jacket surrounds the dry-core tube.

25. A cable as defined in claim 18, wherein the plurality of bundles of electrical conductors are twisted around the jacket.

* * * * *